Oct. 1, 1968  R. R. JUENEMAN  3,403,955
RADIANT ENERGY CONDUCTOR WITH DIFFUSING SURFACE
Filed Nov. 24, 1964
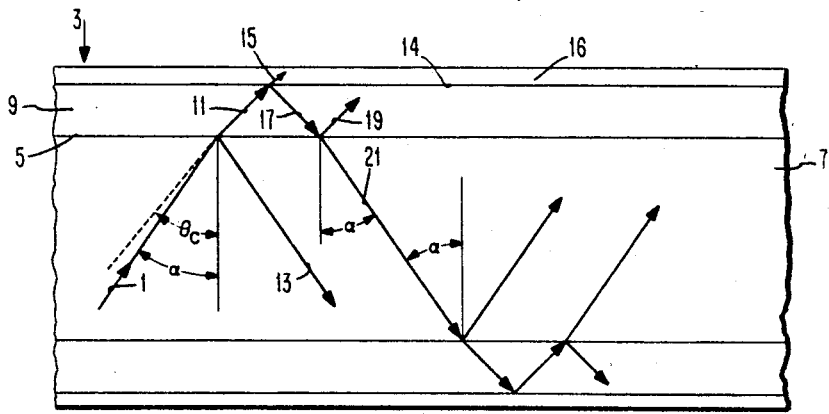
PRIOR ART  FIG. 1
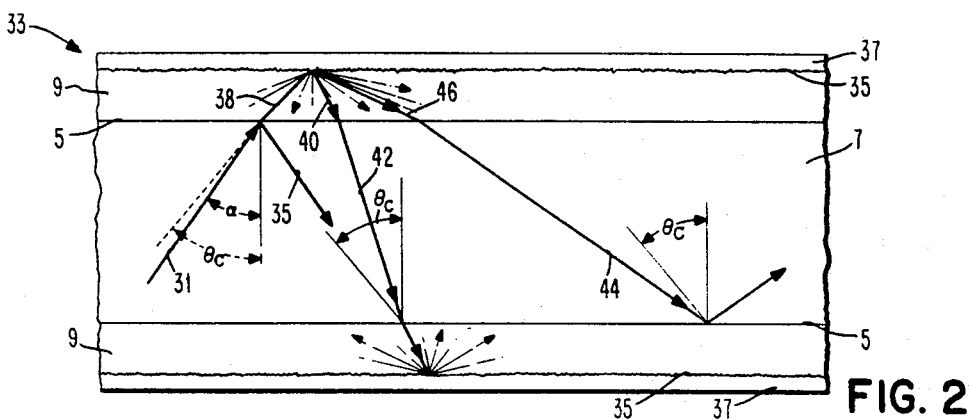
FIG. 2
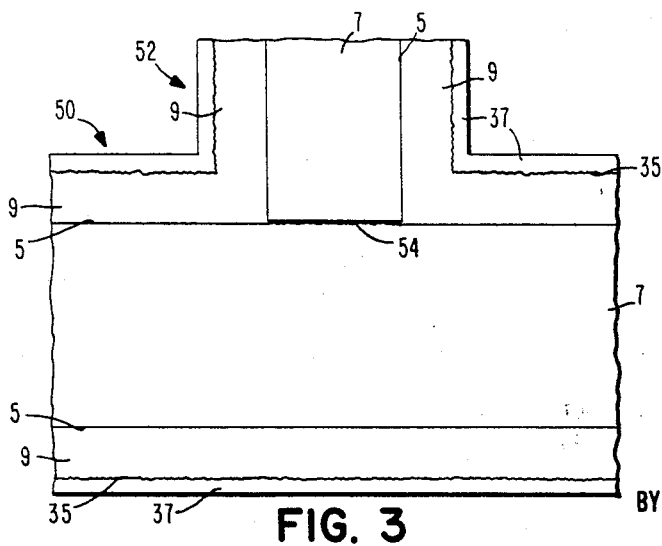
FIG. 3
INVENTOR
ROBERT R. JUENEMAN
BY Donald F. Frei
AGENT 3,403,955
RADIANT ENERGY CONDUCTOR WITH
DIFFUSING SURFACE
Robert R. Jueneman, Huntsville, Ala., assignor to International Business Machines Corporation, New York, N.Y., a corporation of New York
Filed Nov. 24, 1964, Ser. No. 413,451
4 Claims. (Cl. 350—96)

ABSTRACT OF THE DISCLOSURE

A low loss radiant energy transmission means having a central core that is transparent to the wavelength of radiation to be transmitted, and a cladding thereabout which is also transparent to said radiation. The cladding has an index of refraction of magnitude less than that of the central core. The surface of the cladding in contact with the core is without surface imperfections, while the outer surface of the cladding has imperfections of the order of the transmitted wavelength. This outer surface is coated with a material that is reflective to the wavelength of the transmitted energy.

---

This invention relates to radiant energy transmission devices, and more particularly to devices of the stated type capable of transmitting visible and invisible light, including light images, over curved paths.

As will be appreciated by those skilled in the art, the transmission of light, including light images, using conventional light conductors has been subject to serious limitations due to the presence of large transmission losses. These losses, which are occasioned by the presence of sharp bends in the light conductor, primarily comprise losses emanating from the sides of the conductor. For example, it has been found that a single 90° bend in a conductor reduces the light transmitted by a factor of approximately 60%. Obviously, as the bends in the conductor increase in number and severity, the losses due to light escaping from the sides of a conductor increase correspondingly.

The above-noted light losses, which, as mentioned previously, are manifested by light escaping from the sides of the conductor, give rise to two specific related problems. The first problem, the most obvious, relates to the large reduction in efficiency which comes about and increases as the conductor configuration, and hence the light path, becomes more tortuous. This problem obtains whether the light conductors are grouped to form an image transport device or are used individually to transport a beam of light from one point to another as is often done when it is desired to direct a beam of light into an inaccessible place.

The second problem arises when the light conductors are grouped to form an image transport device and involves the inability to obtain good image contrast. This inability to obtain good image contrast is due to a phenomenon known as "cross-talk" which occurs when the individual conductors in a grouped bundle lose light to adjacent conductors thereby destroying the contrast of the resultant image.

Summarizing, the escape of light from the sides of a conductor brought about by the presence of sharp bends therein gives rise to two related problems: (a) marked reduction in transmission efficiency, and (b) poor image contrast when the conductors are grouped to form an image transport device.

The prior art attempts to mitigate the above-noted problems have generally involved coating the central portion of the light conductor, known as the core, along their length with a first layer of material, sometimes called cladding, having a lower refractive index than that of the core. The inner surface of the cladding in combination with the outer surface of the core forms a totally internally reflecting interface, for rays having certain angles of incidence, due to the different refractive indices of the core and cladding. This interface serves to reduce the escape of light from the sides of the conductor thereby enhancing the efficiency of light transmission through the conductor.

The prior art attempts to mitigate the problem of cross-talk between adjacent conductors have generally involved placing a second layer of material about the core. This layer is generally opaque and absorbs any radiant energy which happens to escape from the cladding thereby reducing the cross-talk between adjacent conductors.

While the prior art techniques have afforded a partial solution to the problems enumerated above, the presence of bends in the light conductor still results in some rays escaping from the core and ultimately being lost entirely. Specifically, as long as there are bends in the conductor, some rays will impinge on the cladding-core interface at an angle less than the critical angle $\theta_c$ and escape into the cladding and eventually be absorbed by the outer, opaque coating. The term critical angle as used herein refers to the critical angle for a boundary separating two media and is defined as the smallest angle of incidence, in the medium of greater index, for which light is totally reflecting. As will be understood by those skilled in the art, the critical angle for any interface is a function of the particular materials comprising the two media.

It is therefore an object of this invention to provide an improved radiant energy conductor which obviates the above-noted shortcomings of the prior art.

It is another object of this invention to provide a radiant energy conductor which is more efficient than prior art devices.

It is still another object of this invention to provide an efficient radiant energy conductor which is simply and easily constructed.

It is yet another object of this invention to provide an improved radiant energy conductor, which when grouped to form an image transport device, affords higher contrast than prior art image transport devices.

It is a further object of this invention to provide a radiant energy conductor which can be configured with sharp bends without suffering large transmission losses.

Yet a still further object of this invention is to provide an efficient radiant energy conductor which in no way compromises resolution.

Therefore, in accordance with one aspect of this invention, a radiant energy transmission means is provided which comprises a first and second transmitting medium. The first medium, which is substantially transparent to the energy wavelength or wavelengths being transmitted, is provided with an energy input surface, an energy output surface for exiting the transmitted energy, and a remaining surface which is substantially without surface imperfections of the order of the wavelength or wavelengths being transmitted. The second transmitting medium forming a part of the transmission means of this invention is also substantially transparent to the wavelength or wavelengths being transmitted and has a refractive index of lower magnitude than the first medium. This second medium has a first surface which is substantially in contact with the remaining surface of the first medium and is, like that surface, also without surface imperfections of the order of the transmitted wavlength or wavelengths. The second medium additionally has a second surface. This surface has imperfections of the order of the transmitted wavelength or wavelengths and is coated with reflecting material for reflecting radiant energy of the transmitted wavelength or wavelengths.

In accordance with a more detailed aspect of the invention, a radiant energy transmission means of the type described immediately above is provided which has elongated transmitting media of uniform cross-section.

In accordance with another aspect of this invention, a radiant energy transmission means is provided which comprises a first and second transmitting medium, both of which are substantially transparent to the energy wavelength or wavelengths being transmitted. The first medium is provided with an energy input surface for receiving the radiant energy to be transmitted, an energy output surface for exiting the transmitted energy, a lateral energy distributing surface, and a remaining surface. The distributing surface has imperfections of the order of the transmitted wavelength, or wavelengths, whereas the remaining surface does not. The second medium forming a part of the transmission means of this invention, which has a refractive index lower than that of the first medium, is provided with coextensive inner and outer surfaces. The inner surface is substantially in contact with the remaining surface of the first medium, and, like that surface, is also substantially without surface imperfections of the order of the transmitted wavelength or wavelengths. The outer surface, which has imperfections of the order of the transmitted wavelength or wavelengths, is coated with reflecting material for reflecting radiant energy of the transmitted wavelength or wavelengths.

In accordance with a further aspect of this invention, a transmission means of the type described in the immediately preceding paragraph is additionally provided with a third and fourth transmitting medium. Both the third and fourth media, like the first and second media, are substantially transparent to energy of the transmitted wavelength or wavelengths. The third media, which has an index of refraction equal to or greater than that of the second medium, is provided with three surfaces: an energy receiving surface, an energy exiting surface, and a remaining surface which is without surface imperfections of the order of the transmitted wavelength or wavelengths. The fourth medium, which has a refractive index of lower magnitude than that of the third medium, has a first and second surface. The first surface is substantially in contact with the remaining surface of the third medium and is without surface imperfections of the order of the transmitted wavelength or wavelengths. The second surface, unlike the first surface, has imperfections of the order of the transmitted wavelength or wavelengths and is provided with a coating of radiant energy reflecting material for reflecting radiant energy of the transmitted wavelength or wavelengths.

Numerous advantages have been found to flow from the use of the radiant energy conductor of this invention. For example, efficient conductors can be fabricated using existing manufacturing techniques thereby avoiding the expense of acquiring costly new facilities and equipment. Another advantage is that the simplicity of the conductor makes it possible for them to be mass produced at low unit cost. A further advantage is that the conductors of this invention can be used in all applications that the less efficient, prior art conductors were capable of use in.

The foregoing and other objects, features and advantages of this invention will be apparent from the following more particular description of preferred embodiments, as illustrated in the accompanying drawings.

In the drawings wherein like reference numerals refer to like parts throughout the several views;

FIG. 1 is a vertical section through a portion of a prior art curved radiant energy conductor which depicts the manner in which non-axial radiant energy rays are eventually totally lost by repeated incidence and specular reflection of its components at the outer surface of the cladding.

FIG. 2 is a vertical section through a portion of a curved radiant energy conductor constructed in accordance with the principles of this invention which depicts the manner in which losses are reduced by providing for the diffuse reflection of non-axial radiant energy rays at the outer surface of the cladding.

FIG. 3, which depicts a vertical section through a portion of a main radiant energy conductor having an auxiliary radiant energy conductor for distributing radiant energy, illustrates another application of the radiant energy conductor constructed in accordance with the principles of this invention.

As stated previously, the escape of a ray into the cladding of the prior art conductors eventually resulted in it ultimately being lost. For a graphic history of such a ray depicting the manner in which it is ultimately lost, reference is made to the ray diagram of FIG. 1. It is understood that the light conductor and ray relationships depicted in FIG. 1 could represent either of two situations:

(a) A section of a curved conductor wherein the ray is non-axial due to the conductor curvature, which for the sake of simplicity is depicted as a straight conductor inasmuch as a small section of a curved conductor approaches a straight line as a limit; or (b) The entrance end of a straight conductor section having radiant energy entering in a non-axial mode.

Either of the above situations would produce the ray and conductor relationship depicted in FIG. 1 and to be presently explained.

A ray 1 travelling through the light conductor 3 is incident on the core-cladding interface 5. The interface 5 is formed by the surfaces of the core 7 and the cladding 9. The angle of incidence $\alpha$ of ray 1, being less than the critical angle $\theta_c$ of the interface 5, is partially refracted and partially reflected as shown by rays 11 and 13, respectively. As noted above, this condition of incidence of ray 1, while most likely being produced by a bend in the light conductor 3, could also be produced as a result of other factors. For example, ray 1, could represent a ray incident on the input end of the conductor 3 in a non-axial mode. Refracted ray 11 travels through the cladding and is incident on the interface 14 of the cladding at an angle less than the critical angle. A portion 15 of the ray 11 escapes from the cladding and is absorbed by the opaque coating 16 while the remainder, ray 17, is specularly reflected back to the interface 5. The ray 15, which escaped from the cladding 9, represents a transmission loss. It is losses of this type which reduce the efficiency of the light conductor 3.

While only a portion of ray 1 is lost via ray 15, eventually ray 1 will be entirely lost by repeated impingements of its components at the interface 14. For example, ray 19 will impinge on the interface 14 in a manner similar to ray 11 resulting in a loss. Rays 13 and 21, components of ray 1, will be incident on the core-cladding interface 5 in a manner similar to ray 1 and will produce losses at the interface 14 in the same manner as ray 11.

Summarizing, although only a portion of ray 1 escapes as lost ray 15 in any single impingement upon the interface 14, the specular reflection at the interface 14 refracts the rays back into the core 7 at an angle less than the critical angle resulting, due to the large length to diameter ratio of conventional conductors, in numerous repetitions of the history of ray 1 as the components travel down the conductor. Eventually, the ray, which initially penetrated the cladding, is totally lost.

Now referring to FIG. 2, a sketch is provided of a section of a curved radiant energy conductor constructed in accordance with the principles of this invention. The conductor, which is generally indicated by the numeral 33, comprises a first conducting medium or core 7. The core may have any desired cross-section configuration and may, for example, have a circular, square, rectangular, or triangular cross-section. And, the cross sectional configuration of the core need not be uniform. In fact, in many instances it may be desirable that the cross-section be nonuniform as, for example, when it is desired that the light conductor convert a point source of light into a line of light. As for the cross-sectional dimensions of the core, this, too, will vary with the application. For example, if the conductors are to be grouped together to form an image transport of high resolution, then the cross-sectional dimensions will be small. On the other hand, if it is desired to use the conductor to provide light in inaccessible places, then a single conductor having a core of larger diameter is sufficient. Additionally, the core may be constructed of any number of different materials depending on the wavelength or wavelengths of radiant energy it is desired to transmit. For example, if it is desired to transmit ultra-violet radiation the core may be made of quartz or fluorite, both of which are transparent to ultra-violet radiation. Or if it is desired to transmit visible light radiation, the core 7 may be made, for example, from any of the well-known crown or flint glasses. The only requirement for the core material is that it be substantially transparent to the wavelength or wavelengths of radiant energy being transmitted.

The surface of the core along its length should be substantially free of surface imperfections of the order of the wavelength or wavelengths being transmitted. Such is necessary to enhance the internal reflection properties of the core 7 to rays of radiant energy incident on the core surface at angles less than the critical angle $\theta_c$.

The end surfaces (not shown) of the core 7 should preferably be without imperfections of the order of the wavelength or wavelengths being transmitted. However, this general rule may vary depending on the application of the conductor. For example, the output end of the core, through which the transmitted energy exists, may contain imperfections of the order of the wavelength or wavelengths transmitted if it is desired to create the effects of a Lambertian light source. I.e., if it is desired that the energy transmitted by the conductor be radiated in all directions at the exiting end thereof, the exiting end may be provided with surface imperfections of the order of the wavelength or wavelengths being transmitted.

Around the remaining or lateral surface of the core 7 and in intimate contact therewith is a second transmitting medium or cladding 9. The cladding 9 may, like the core 7, be constructed of various materials depending on the wavelength or wavelengths of radiation to be transmitted. And like the core 7, the cladding 9 should be constructed of a material substantially transparent to radiation of the wavelength or wavelengths being transmitted. In addition to this requirement of transparency, the material from which the cladding 9 is constructed should have a refractive index of lower magnitude than that of the core material. Such a difference in refractive indices of the core 7 and cladding 9 renders the interface 5 formed by the core and cladding an internally reflecting boundary having a critical angle $\theta_c$. The value of $\theta_c$ for this interface, as determined by Snell's law, $$\text{is } \theta_c = \text{arc sin} \frac{n_{cladding}}{n_{core}}$$

The internal surface of the cladding should be without surface imperfections of the order of the wavelength or wavelengths of energy being transmitted and, as indicated above, should be so contoured as to be in substantially intimate contact with the core surface. The thickness of the cladding is not critical. However, the thinner the cladding the less will be the absorptive loss of rays that escape into the cladding.

The cladding 9 may be placed about the core 7 in any well-known and convenient manner. For example, if the cladding is to be one of the well-known transparent organic compositions, such as methyl methacrylate, the cladding may be applied by a spraying, dipping process, or extrusion process. As for the configuration and uniformity of the cladding cross-section, they are not critical. It is preferable that the radial dimension or thickness of the cladding be uniform around the core periphery at any one point along the length of the core as well as uniform from point to point along the length of the core.

The outer surface 35 of the cladding 9 is provided with surface imperfections of the order of the wavelength or wavelengths of radiation being transmitted. These imperfections are provided to insure diffuse reflection of any radiation that might escape from the core 7 into the cladding 9. The diffuse reflection of escaped radiation at the surface 35 in effect divides the reflected radiation into two components, namely, a component which is refracted into the core at an angle less than the critical angle $\theta_c$ and a component refracted into the core at an angle greater than the critical angle $\theta_c$. The importance of diffuse reflection as opposed to specular deflection at surface 35 will become apparent in the discussion of the operation of the conductor 33 to follow herein. The surface imperfections on the outer cladding surface 35 may be produced in a variety of well-known ways. For example, the cladding surface 35 may be mechanically abraded, as by sandblasting or, etched.

In order to enhance the reflection of radiation at the outer surface 35 of the cladding the surface is coated with reflecting material 37. The reflecting material may be silver or aluminum, for example, and may be applied in any convenient manner such as vacuum deposition, spraying, painting, etc. The only requirement with respect to the coating 37 is that it be capable of reflecting radiation of the wavelength or wavelengths being transmitted. For example, if visible light is being transmitted, silver would be a satisfactory reflecting material. The thickness of the coating as well as its uniformity is not critical.

Before a discussion of the operation of the radiant energy conductor 33 is undertaken, it is essential to understand that the ray diagram and conductor relationship depicted in FIG. 2 can represent either of two situations:

(a) A section of a curved conductor wherein the ray is non-axial due to the conductor curvature, which for the sake of simplicity is depicted as a straight conductor inasmuch as a small section of a curved conductor approaches a straight line as a limit; or (b) The entrance end of a straight conductor section having radiant energy entering in a non-axial mode.

Either of the above situations would produce the ray and conductor relationship depicted in FIG. 2 and to be presently explained. Additionally, it should be understood that the ray and conductor relationships depicted in FIG. 1 with respect to the prior art conductor could likewise be the result of either of the two situations noted above with respect to FIG. 2.

Referring to FIG. 2, a non-axial ray 31 is seen to be incident on the interface 5 of the core 7 and cladding 9. The angle of incidence $\alpha$ being less than the critical angle $\theta_c$, produces partial reflection and partial refraction of the incident ray 31. The refracted component 38 of ray 31 escapes into the cladding 9 where it travels through the cladding and is incident on the outer surface 35 thereof at an angle less than the critical angle. As will be remembered from the previous description of the construction of the conductor 33, and more particularly of the cladding surface 35, the surface 35 contains surface imperfections of the order of the wavelength or wavelengths of the radiant energy being transmitted. As will be further remembered, the diffusely reflecting surface 35 is coated with a reflecting material 38 which reflects radiant energy of the wavelength or wavelengths being transmitted. Hence, the refracted component 38 of ray 31, which is incident on the surface 35 at an angle less than the critical angle, will be diffusely reflected due to the non-planar characteristics of the surface 35. Also, a portion of this ray 38 will be absorbed by the reflective coating 37 representing a radiant energy transmission loss corresponding to the energy ray 15 lost at the interface 14 of the prior art conductor 3 depicted in FIG. 1.

Returning now to the reflected component of ray 38, it is seen that the diffuse nature of this reflected component has been depicted by a plurality of dotted line arrows radiating throughout 180°. It will be understood by those skilled in the art that the reflecting surface 35 behaves like a Lambertian surface, i.e., the direction of the radiant energy reflected therefrom comports with the Lambert Cosine Law. For the purpose of simplifying the discussion of the reflection phenomenon occurring at surface 35, the energy diffusely reflected therefrom will be considered as represented by two components. The first component, ray 40, is refracted into the core 7 at an angle less than the critical angle $\theta$, and represents all those diffusely reflected rays which would be similarly refracted into the core. The result of such refraction into the core at less than the critical angle $\theta_c$ in that refracted ray 42 will be incident on the core-cladding interface 5 at an angle less than the critical angle $\theta_c$ and will behave in much the same manner as ray 31. The second component, ray 46, is refracted into the core 7 at an angle greater than the critical angle $\theta_c$, and represents all those diffusely reflected rays which would be similarly reflected into the core. Refracted ray 44, unlike ray 42, will be captured by the core 7 because it will be internally reflected at the core-cladding interface 5.

It is important to note at this point, the structural and operational differences between the conductor 33 depicted in FIG. 2, which is constructed in accordance with the principles of this invention, and the prior art conductor depicted in FIG. 1. The prior art conductor 3 has a cladding whose outer surface is without surface imperfections of the order of the transmitted wavelength or wavelengths. Hence, any ray which escapes into the cladding will have a portion of its energy lost as depicted by ray 15, the remainder being specularly reflected as shown by ray 17. Any portion of ray 17, which happens to be refracted into core, will be incident on the interface 5 at an angle less than the critical angle $\theta_c$. Such an incident condition, being identical to that of ray 1, will produce the same transmission loss at the interface 14 as was produced and represented by ray 15. Due to the extremely large length to diameter ratio of a typical conductor, the number of times a ray such as ray 1 can traverse the conductor is very large. These traversals would be tolerable if there was no loss at interface 14 as represented by ray 15 as would be the case, for example, if interface 14 were a perfect reflector. However, no perfect metallic reflectors exist. Therefore, the repeated traversals of ray 1 back and forth across the conductor as the ray travels along the conductor eventually cause the entire ray to be lost. Summarizing, with the prior art conductors any ray which escapes to the cladding as a result, for example, of a sharp bend in the conductor, will eventually be totally lost by repeated partial specular reflections at the interface 14.

In contrast to the prior art conductor depicted in FIG. 1, the conductor of this invention depicted in FIG. 2 will not produce a total loss of an escaping ray due to the nature of the reflection at the outer surface of the cladding. The conductor of this invention utilizes diffuse reflection, in contradistinction to specular deflection, thereby facilitating the refraction of a portion of the diffusely reflected energy into the core at an angle greater than the critical angle $\theta_c$. The net result is that the core 7 permanently captures a portion, ray 44, of the escaping ray 31 by internally reflecting it at the interface 5. This captured ray 4 is not lost by repeated reflections at outer cladding surface 35. Of course, the other portion of the diffusely reflected energy, ray 40, is refracted into the core as ray 42 at an angle less than the critical angle. Hence, ray 42 re-enters the cladding 9 resulting in additional losses by less than total reflection at the surface 35.

Summarizing, with the conductor of the invention as depicted in FIG. 2, the diffuse, non-specular reflection at the surface 35 permits a portion of the reflected light to re-enter the core 7 at an angle greater than the critical angle and thereby be permanently captured. This is in contrast to the prior art conductors as depicted in FIG. 2, which, as a result of specular reflection at the interface 14, do not refract any portion of the reflected energy into the core at an angle such that it will be permanently captured. But, instead the prior art conductors, as a result of specular reflection at the interface 14, eventually lose all the energy of an escaping ray by repeated reflections at the interface 14. While the description of this invention has so far focused on a single embodiment, other embodiments utilizing the principles of this invention are possible. For example, referring to FIG. 3, a main light conductor 50 is depicted which is identical to the light conductor 33 depicted in FIG. 2 except for the fact that a lateral radiant energy distributing surface 54 is provided. This surface 54 has imperfections therein of the order of the wavelength or wavelengths transmitted and therefore diffusely radiates energy incident thereon. To collect the energy distributed by the surface 54, a branch light condutcor 52 similar to that depicted in FIG. 2 is provided. The core of the branch conductor 52 has its end in contact with the energy distributing surface 54. As a result of the physical relationship between the end of the core of branch 52 and the surface 54, the conductor branch 52 collects and efficiently transmits the light diffusely radiated from surface 54. Of course, it will be understood by those skilled in the art that the angle between the branch 52 and the main conductor 50 may vary and need not be 90° as shown.

The branch light conductor 52 may be eliminated if a Lambertian source is desired. With the branch conductor 52 removed, the main conductor 50 will conduct radiant energy along the conductor 50 distributing some energy to surface 54, which surface having imperfections of the order of the wavelength or wavelengths being transmitted will act as a Lambertian source diffusing radiant energy.

It is also possible when grouping a plurality of light conductors to form an image transport, to shape the plane of curvature of the object end of the transport so as to fit closely adjacent the image providing means. Specifically, if the image providing means is a cathode ray tube screen, the object plane of the transport device could be concave to fit the convex screen.

Additionally, it may be desirable to provide an image transport device with conductors which gradually increase or decrease in diameter along their length so as to magnify or reduce, respectively, the size of the image produced at the image plane.

Although this invention has been particularly shown and described with reference to preferred embodiments thereof, it will be understood by those skilled in the art that various changes in form and details may be made therein without departing from the spirit and scope of the invention.

I claim:

1. Radiant energy transmission means for transmitting radiant energy of at least one specified wavelength, said means comprising:

a first light conducting core substantially transparent to radiant energy of said specified wavelength, said core comprising an energy input surface, an energy output surface, and a remaining peripheral surface, said remaining surface being substantially without surface imperfections of the order of said specified wavelength; and a cladding substantially transparent to radiant energy of said specified wavelength and having a refractive index of lower magnitude than that of said core, said cladding comprising a first surface substantially in contact with said remaining surface of said core and being substantially without surface imperfections of the order of said specified wavelength, said cladding additionally comprising a second surface having surface imperfections of the order of said specified wavelength for diffusing said radiant energy and being substantially coated with radiant energy reflecting material for reflecting radiant energy of said specified wavelength.

2. Radiant energy transmission means for transmitting radiant energy of at least one specified wavelength, said means comprising:

an elongated light conducting core substantially transparent to radiant energy of said specified wavelength, said core comprising an energy input surface end, an energy output surface end, and a lateral surface, said lateral surface being substantially without surface imperfections of the order of said specified wavelength; and a cladding substantially transparent to radiant energy of said specified wavelength and having a refractive index of lower magnitude than that of said elongated core, said cladding comprising an inner surface substantially in contact with said lateral surface and being substantially without surface imperfections of the order of said specified wavelength, said cladding additionally comprising an outer surface substantially parallel to said inner surface and having surface imperfections of the order of said specified wavelength, for diffusing said radiant energy said outer surface being substantially coated with radiant energy reflecting material for reflecting radiant energy of said specified wavelength.

3. Radiant energy transmission means for transmitting radiant energy of at least one specified wavelength, said means comprising:

a light conducting core substantially transparent to radiant energy of said specified wavelength, said core comprising an energy input surface, an energy output surface, at least one radiant energy distributing surface, and a remaining peripheral surface, said distributing surface having imperfections of the order of said specified wavelength, for diffusing said radiant energy said remaining surface being substantially without surface imperfections of the order of said wavelength; and a cladding substantially transparent to radiant energy of said specified wavelength and having a refractive index of lower magnitude than that of said core, said cladding comprising an inner surface substantially in contact with said remaining surface and being substantially without surface imperfections of the order of said specified wavelength, said cladding additionally comprising an outer surface co-extensive with said inner surface and having surface imperfections of the order of said specified wavelength, for diffusing said radiant energy said outer surface being substantially coated with radiant energy reflecting material for reflecting radiant energy of said specified wavelength.

4. Radiant energy transmission means for transmitting radiant energy of at least one specified wavelength, said means comprising:

a first transmitting medium substantially transparent to radiant energy of said specified wavelength, said first medium comprising an energy input surface, an energy output surface, at least one energy distributing surface, and a remaining surface, said distributing surface having imperfections of the order of said specified wavelength, for diffusing said radiant energy said remaining surface being substantially without surface imperfections of the order of said specified wavelength;

a second transmitting medium substantially transparent to radiant energy of said specified wavelength and having a refractive index of lower magnitude than that of said first medium, said second medium comprising an inner surface substantially in contact with said remaining surface of said first medium and being substantially without surface imperfections of the order of said specified wavelength, said second medium additionally comprising an outer surface having surface imperfections of the order of said specified wavelength for diffusing said radiant energy and being substantially coated with radiant energy reflecting material for reflecting radiant energy of said specified wavelength;

a third transmitting medium substantially transparent to radiant energy of said specified wavelength and having a refractive index equal to or greater in magnitude than that of said first medium, said third medium comprising an energy receiving surface and, an energy exiting surface, and a remaining surface being without surface imperfections of the order of said specified wavelength, said energy receiving surface is substantially in contact with said energy distributing surface; and a fourth transmitting medium substantially transparent to radiant energy of said specified wavelength and having a refractive index of lower magnitude than that of said third medium, said fourth medium comprising a first surface substantially in contact with said remaining surface of said third medium and being substantially without surface imperfections of the order of said specified wavelength, said fourth medium additionally comprising a second surface having surface imperfections of the order of said specified wavelength for diffusing said radiant energy and being substantially coated with radiant energy reflecting material for reflecting radiant energy of said specified wavelength.

References Cited

UNITED STATES PATENTS

| | | | |
|---|---|---|---|
| 3,141,106 | 7/1964 | Kapany | 350—96 X |
| 3,154,751 | 10/1964 | Wentz et al. | 88—1 |
| 3,183,295 | 5/1965 | Myles | 350—96 X |

JOHN K. CORBIN, *Primary Examiner.*